March 31, 1931. T. C. DIBBLE 1,798,402
PORTABLE SAW
Filed Nov. 28, 1930
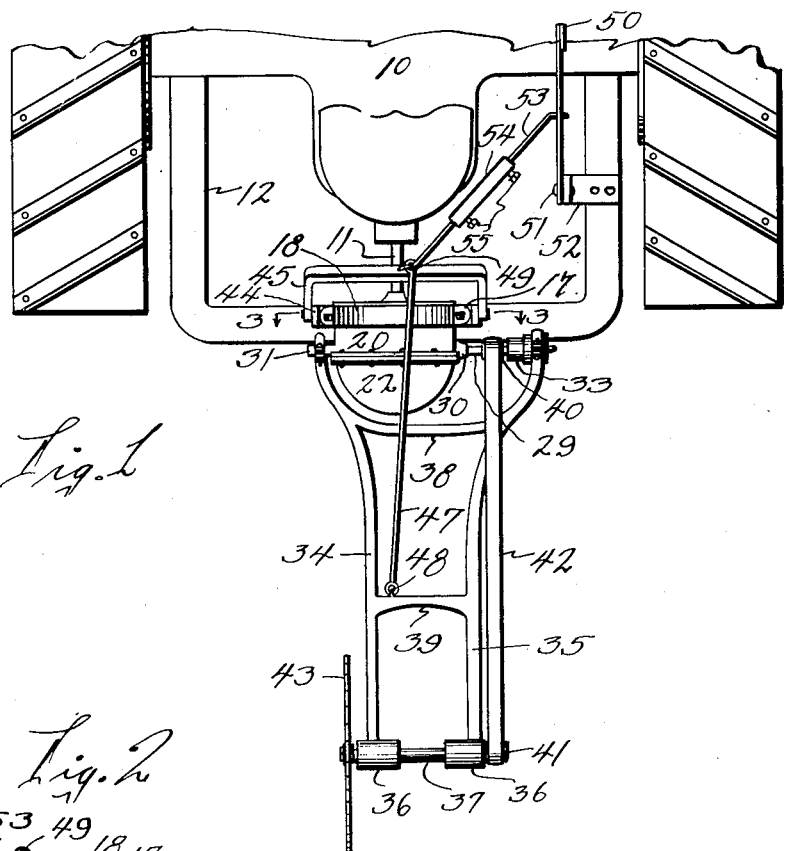
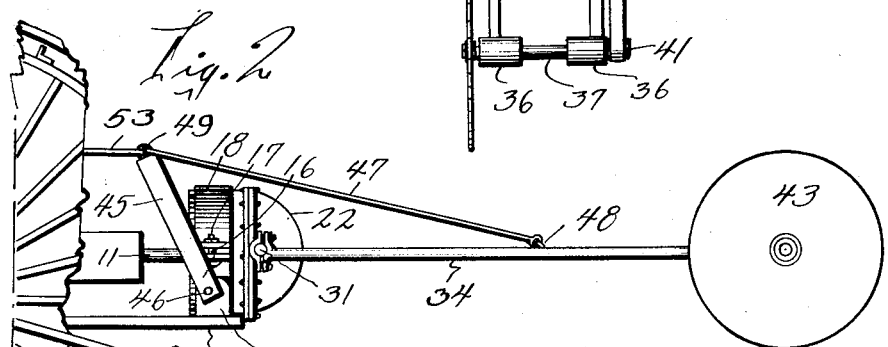
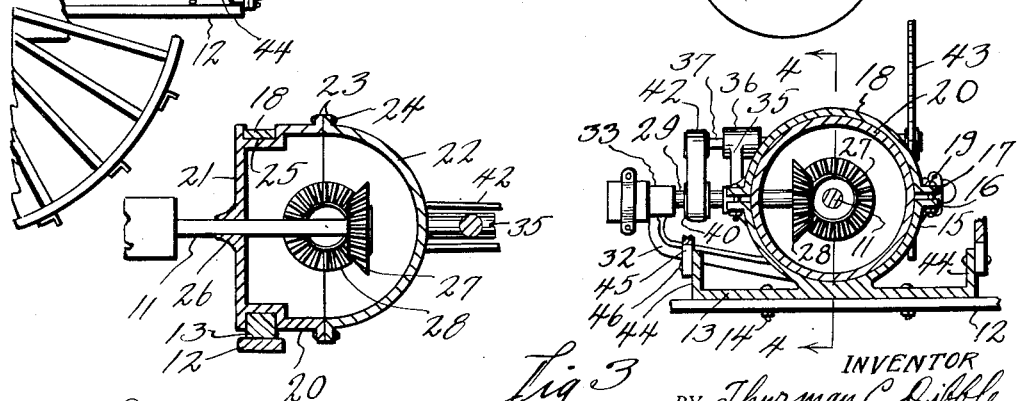
INVENTOR
BY Thurman C. Dibble
ATTORNEY Patented Mar. 31, 1931

1,798,402

UNITED STATES PATENT OFFICE

THURMAN C. DIBBLE, OF PLAINVIEW, NEBRASKA

PORTABLE SAW

Application filed November 28, 1930. Serial No. 498,641.

My invention relates to portable buzz saws and has for its object to provide a simple, durable, and inexpensive saw attachment for a common type of tractor.

More particularly, it is my object to provide a saw attachment including means for mounting the saw and power transmission means attachable to the power take-off shaft of the tractor.

A further object of the invention is to provide an arrangement whereby the saw may be tilted around a horizontal axis perpendicular to the axis of rotation of the saw whereby the saw may be shifted from a vertical plane or to a horizontal plane or to any plane intermediate said planes.

A further object is to provide in such an arrangement, means for swinging the saw about an axis parallel to the axis of rotation of the saw whereby the saw may be translated from side to side during sawing operations.

Another object is to provide an arrangement wherein the swinging operation may be controlled irrespective of the position of tiltable adjustment of the saw.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1, is a plan view of the saw attached to a tractor,

Figure 2, is a side elevation of the same,

Figure 3, is a sectional view through the transmission housing taken on the line 3—3 of Figure 1, and Figure 4, is a sectional view through the transmission housing taken on the line 4—4 of Figure 3.

In the accompanying drawings, I have used the reference character 10 to indicate generally a tractor which has the power take-off shaft 11 and the draw bar 12.

The attachment of my invention comprises a bracket 13 attachable as by means of bolts 14 to the draw bar 12. The bracket 13 is formed with a semi-circular bearing socket 15 provided at its ends with ears 16 to which the ears 17 of the semi-circular bearing cap 18 are secured as by means of bolts 19.

Within the ring formed by the socket 15 and cap 18 is journalled the gear housing 20. By loosening the bolts 19, the housing 20 may be rotated within the bracket ring, and by tightening the bolts 19, the housing may be secured rigidly in any desired position of axial adjustment.

The housing is formed in two halves, 21 and 22, and joined by flanges 23 and bolts 24. The housing member 21 is provided with a depressed annular groove 25 in which the bracket ring is received.

A bearing 26 is formed in the center of the housing member 21, and the shaft 11 is extended therethrough and journalled therein. To the end of the shaft 11 is secured a bevel gear 27 which meshes with a bevel gear 28 on a short shaft 29 journalled in a bearing 30 formed on the annular wall of the housing member 21.

Opposite the bearing 30 and axially aligned therewith, a stud 31 is formed on the housing member 21 and projects outwardly therefrom.

Formed integrally with the housing member 21, an arm 32 projects outwardly beneath the bearing 30 and at its outer end supports a bearing 33 in which the outer end of the shaft 29 is journalled.

The saw frame comprises a pair of arms 34 and 35 journalled respectively on the stud 31 and bearing 33, and provided at their opposite ends with bearings 36 in which the saw shaft 37 is journalled.

The arms 34 and 35 are rigidly connected in some manner, as by means of the integral webs or cross arms 38 and 39.

Pulleys 40 and 41 are mounted on the shafts 39 and 37 respectively, and are connected by a belt 42.

A saw blade 43 is mounted on the shaft 37.

The bracket 13 is provided at its outer ends with arms 44 projecting upwardly. A yoke 45 is pivoted at 46 to the arms 44, and a link 47 is pivoted at 48 to the cross arm 39 and at 49 to the yoke 45.

A lever 50 is pivoted at 51 to a bracket 52 secured to the draw bar 12 or to some suitable member of a tractor, and is connected to the yoke 45 by means of an adjustable rod 53. A sleeve 54 connects the two halves of the rod 53 and is secured thereto as by set screws 55, thus allowing the rod 53 to be adjusted for length.

In the operation of the device, assuming the saw to be adjusted to the position shown in Figure 1, rotative movement is transmitted to the sawblade 43 through the power take-off shaft 11, the gears 27 and 28, the shaft 29, the belt 42, and the shaft 37. The saw may be moved in its own plane by moving the lever 50 back and forth, causing the saw frame to swing upwardly and downwardly. The yoke 45 acts as a swinging fulcrum and makes it possible to direct the pull against the saw frame at a steeper angle than would be possible if the link 47 were hooked directly to the lever.

The swinging movement of the frame does not interfere in any way with the transmission of power to the sawblade, since the frame is swung from the axis of the shaft 29.

When it is desired to employ the saw to cut down trees, the blade 43 may be shifted to a horizontal position by loosening the cap 18, loosening the set screws 55, and rotating the gear housing 20 about the axis of the shaft 11. In this connection, it is to be noted that the bracket ring is positioned co-axially with the shaft 11.

When the saw has been brought to the proper plane, the cap 18 may be again tightened, the set screws 55 tightened to secure the rod 53 in its elongated or shortened position and the device is again ready for use.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention

1. In a portable saw attachment for a tractor having a draw bar and a power take-off shaft extending above the draw bar, a gear supporting member having a bearing in which said power take-off shaft is journalled, means for mounting said gear supporting member upon the draw bar and for securing it in any of a number of positions rotatably adjusted about the axis of the power take-off shaft, a saw frame swingingly mounted on said gear supporting member, a power transmission shaft mounted in the gear supporting member substantially parallel to the axis upon which said frame swings and perpendicular to the axis of the power take-off shaft, a saw shaft journalled in the outer end of the frame, drive means connecting the saw shaft and the power transmission shaft, and bevel gears on the power take-off shaft and transmission shaft respectively, meshing with each other for transmitting rotation from the power take-off transmission shaft.

2. In a portable saw attachment for a tractor having a draw bar and a power take-off shaft extending above the draw bar, comprising a bracket attachable to the draw bar, a gear housing rotatably mounted on said bracket, and provided with a bearing in which said power take-off shaft is journalled, a transmission shaft, journalled in said housing in a position perpendicular to the power take-off shaft, a saw frame pivoted to the housing on an axis substantially parallel to the transmission shaft, bevel gears on the transmission shaft and the power take-off shaft respectively in mesh with each other, a saw shaft journalled in the saw frame near its outer end, power transmitting means connecting said saw shaft and said transmission shaft.

3. In a portable saw attachment for a tractor having a draw bar and a power take-off shaft extending above the draw bar comprising a bracket attachable to the draw bar, a gear housing rotatably mounted on said bracket, and provided with a bearing in which said power take-off shaft is journalled, a transmission shaft journalled in said housing in a position perpendicular to the power take-off shaft, a saw frame pivoted to the housing on an axis substantially parallel to the transmission shaft, bevel gears on the transmission shaft and the power take-off shaft respectively in mesh with each other, a saw shaft journalled in said frame near its outer end in a position substantially parallel to the transmission shaft, driving and driven elements on the transmission shaft and saw shaft respectively, and a flexible, endless power transmitting device connecting said driving and driven elements.

4. In a portable saw for a tractor having a draw bar and a power take-off shaft extending thereabove, a bracket attachable to the draw bar and including a split ring positioned co-axially with the power take-off shaft, a gear housing mounted in said split ring for rotatable movement and provided with a bearing in which said power transmitting shaft is journalled, a transmission shaft mounted in the housing perpendicular to the power take-off shaft, bevel gears on the two shafts meshing with each other, a saw frame pivoted to the housing on an axis substantially parallel to the transmission shaft, a saw shaft journalled in the frame near its outer end in a position substantially parallel to the transmission shaft, and transmission means connecting the saw shaft and the transmission shaft.

5. In a portable saw for a tractor having a draw bar and a power take-off shaft extending thereabove, a bracket attachable to the draw bar and including a split ring positioned co-axially with the power take-off shaft, a gear housing mounted in said split ring for rotatable movement and provided with a bearing in which said power transmitting shaft is journalled, a transmission shaft mounted in the housing perpendicular to the power take-off shaft, bevel gears on the two shafts meshing with each other, a saw frame pivoted to the housing on an axis substantially parallel to the transmission shaft, a saw shaft journalled in the frame near its outer end in a position substantially parallel to the transmission shaft, transmission means connecting the saw shaft and the transmission shaft, and means connecting the ends of said split ring for tightening the ring into engagement with the housing to secure the same in any adjusted position.

Signed this 10th day of November, 1930, at Sioux City, Iowa.

THURMAN C. DIBBLE.